US009188185B2

(12) United States Patent
Boes et al.

(10) Patent No.: US 9,188,185 B2
(45) Date of Patent: Nov. 17, 2015

(54) ELASTIC COUPLING DEVICE, DAMPING ARRANGEMENT AND METHOD FOR MANUFACTURING THE ELASTIC COUPLING PIECE

(75) Inventors: Sebastian Boes, Brachttal (DE); Joerg Ditzel, Freigericht (DE)

(73) Assignee: Anvis Deutschland GmbH, Steinau an der Strasse (DE)

( * ) Notice: Subject to any disclaimer, the term of this patent is extended or adjusted under 35 U.S.C. 154(b) by 259 days.

(21) Appl. No.: 13/482,461

(22) Filed: May 29, 2012

(65) Prior Publication Data

US 2012/0306119 A1 Dec. 6, 2012

(30) Foreign Application Priority Data

May 30, 2011 (DE) ........................ 10 2011 102 780

(51) Int. Cl.
*F16F 1/38* (2006.01)
*B60R 21/203* (2006.01)

(52) U.S. Cl.
CPC ........... *F16F 1/3842* (2013.01); *B60R 21/2037* (2013.01); *F16F 2226/00* (2013.01)

(58) Field of Classification Search
CPC ........................... F16F 1/3842; B60R 21/2037
See application file for complete search history.

(56) References Cited

U.S. PATENT DOCUMENTS 4,911,991 A * 3/1990 Van Ooij ........................ 428/658
7,721,603 B2 * 5/2010 Ingrisch et al. ................. 73/494

FOREIGN PATENT DOCUMENTS

DE 10 2005 055 934 A1 5/2007
DE 10 2004 051 942 B4 9/2008
DE 10 2008 010 859 A1 8/2009
DE 10 2008 039 936 A1 3/2010
DE 10 2010 062 878 B3 6/2012

OTHER PUBLICATIONS

"Cross-Link", Wikipedia, Feb. 25, 2011 revision, accessed at http://en.wikipedia.org/w/index.php?title=Cross-link&oldid=415893172 on Jun. 24, 2014.*
Machine translation of DE102009039936 of record acquired from Espace.net on Jun. 23, 2014.*
Machine translation of DE102008010859 of record acquired from Espace.net on Jun. 23, 2014.*
German Patent and Trademark Office, German Office Action, German Application No. DE 10 2011 102 780.0, dated Jun. 28, 2012.

* cited by examiner

*Primary Examiner* — Alison Hindenlang
(74) *Attorney, Agent, or Firm* — Dennis J. Williamson; Moore & Van Allen PLLC

(57) ABSTRACT

An elastic coupling device for elastically connecting a damping mass like a gas generator to a motor vehicle part exposed to oscillations and/or vibrations, in particular an airbag module, in one embodiment comprising a rigid support ring facing the vehicle, at least one fixation piece like a rivet head, the fixation piece facing the damping mass and being made of a rigid material, and a spring body coupling the support ring and the fixation piece. The support ring and/or the fixation piece, respectively made of a plastic material, as well as the spring body, which may be made of an elastomer material, may be produced in a single manufacturing step by means of a two-component process, in particular by two-component injection molding.

17 Claims, 2 Drawing Sheets

1
A
21
23
5
7
3
IV
17
11
15

13
1
R
II
3
R
II

ELASTIC COUPLING DEVICE, DAMPING ARRANGEMENT AND METHOD FOR MANUFACTURING THE ELASTIC COUPLING PIECE

CROSS-REFERENCE TO RELATED APPLICATION

This application claims the benefit of priority under 35 U.S.C. §119 to German Patent Application No. 102011102780.0, filed May 30, 2011, the entire contents of which are hereby incorporated by reference.

BACKGROUND

Aspects of the present invention relate to an elastic coupling device or piece for elastically connecting a damping mass like a gas generator to a motor vehicle part exposed to oscillations and/or vibrations, in particular an airbag module, a steering wheel structure or a body part fixed to the steering wheel structure.

During driving of a motor vehicle highly dynamic vibrations and/or oscillations act upon the vehicle body and thus also upon the steering wheel that is to be operated by the driver of the motor vehicle. It is common knowledge to dampen these vibrations and oscillations by elastically and oscillatingly suspending in the range of the natural frequency of the steering wheel a damping mass for example at the steering wheel. In the area of the steering wheel the damping mass is often formed by the gas generator of an airbag module that is to be fixed to the steering wheel of the motor vehicle.

An important aspect of the damping is determined by the design of the elastic connection system that is defined by the elastic coupling piece. From DE 10 2004 051 942 B4 an elastic coupling piece is known that comprises a support element fixed towards the vehicle body, for example to the steering wheel structure, rigidly via screw connections. The support element consists of a plastic material like PA66 with a proportion of fibre glass of 30 to 40%. DE 10 2004 051 942 B4 teaches to arrange a solid spring body made of elastomer material between the gas generator and the motor vehicle body such that a damping counter-oscillation is possible. Openings are provided in the support element that are lined and overmoulded with elastomer material in order to realise a force-transmitting positive connection between the support element and the spring body. In this way a structural fixation is created between the support element and the spring body with which even large loading tensions can safely be transmitted from the support element into the spring body and back. A structural engagement of the spring body with the support element and vice versa is realised by the lining of the openings. This fixation based on a positive connection proved to be sufficiently firm but requires a larger space due to the openings or anchor holes and creates challenges concerning manufacturing leading to an increased financial burden for the manufacturer.

However, for the known overmoulding of the support element no bonding agent is required for the elastomer material for forming undercuts and engagement structures in order to provide a force-transmitting transition between the elastomer material and the plastic material of the support element.

SUMMARY

Embodiments of the present invention may provide an elastic coupling piece for elastically connecting a damping mass to a motor vehicle part and in particular may provide a sufficiently firm force transmission transition between the support element facing the body and the elastomer body facing the damping mass without providing a bonding agent between the elastomer material and the plastic material.

According to one aspect of the present invention, an elastic coupling piece or device is provided for elastically connecting a damping mass like a gas generator to a motor vehicle part exposed to oscillations and/or vibrations, in particular an airbag module. The elastic coupling piece or device comprises a rigid support ring facing the motor vehicle that is to be in particular rigidly connected to the motor vehicle part like a steering wheel structure of a motor vehicle. The elastic coupling piece comprises further a fixation piece that can be designed like a rivet head or a latching device and consists of a rigid material. The fixation piece serves the purpose of rigidly connecting the elastic coupling piece to the damping mass. In direction of force transmission between the damping mass and the body part of the motor vehicle a spring body is provided between the fixation piece facing the damping mass and the support ring facing the motor vehicle part. The spring body allows a dampening, oscillating movement between the body part and the damping mass in particular in the resonance frequency range. The support ring and/or the fixation piece may be respectively made from a plastic material, wherein preferably the same plastic material can be used for the support ring and the fixation piece. Different rigid plastic materials may also be used. It is also imaginable that either the support ring or the fixation piece is formed from a metal like premium steel. The spring body consists of an elastomer material. According to the invention, the support ring, the fixation piece and the spring body may be manufactured by means of a two-component-process, in particular a two-component injection moulding process.

The two-component manufacturing process may provide sufficient fixation strength between the spring body and the fixation piece as well as between the spring body and the support ring, in order to provide an oscillation of the connection system for coupling the damping mass to the body part of the motor vehicle. The connecting transitions between the elastomer material and the plastic material may be designed so strongly that connecting surfaces having no positive engagement provide sufficient force transmission. Even plane transition surfaces without steps are sufficient to provide firm connection of the spring body to the respective plastic material.

According to another aspect of the present invention, particularly good, wear resistant elastic coupling parts may be achieved when solid silicone or liquid silicone rubber, in particular EPDM, NR are used. Compared to thermoplastic elastomer materials (TPE) these elastomer materials are characterised by a significantly improved setting behaviour, in particular at higher temperatures. Also the oscillating behaviour changes less for the preferred elastomer materials in comparison to TPE. For EPDM, NR and silicone the temperature effect is smaller. In particular the Shore hardness is essentially constant over a large temperature range.

Strongly adhesive transitions between the elastomer material and the plastic material may be associated with the preferred elastomer materials, in particular liquid silicone, wherein the adhesion force also remains constant over a large temperature range.

In principle, preferably the plastic material and the elastomer material may be matched to each other, in particular selected, such that a boundary surface area at the transition between the plastic material and the elastomer material forms a chemical cross-link. This chemical cross-link is particularly apparent for natural or synthetic rubber, solid silicone, or liquid silicone rubber.

With respect to the plastic material of the support ring and the fixation piece it is to be noted that the plastic material can of course be combined with metal sections. It should be understood for the plastic material or an additional metal material that the fixation piece or the support ring are fixed to the body part by means of a respectively suited welding method.

In a preferred embodiment of the present invention a boundary surface area at the transition between the plastic material and the elastomer material is void of a bonding agent. Thus, environment protecting methods for discharging production residues become redundant. Also, the environmentally hazardous solvents which need to be provided in bonding agents do not become a load for the environment.

Preferably the support ring or the fixation piece is made of a metal like premium steel. In this case an additional metal layer, in particular a ZnNi layer can be provided in the boundary surface area at the transition between the metal section of the support ring or the fixation piece and the elastomer material. In this way the chemical cross-link within the elastomer material is strengthened. In particular, pairings are to be provided between the liquid silicone and a ZnNi-surface at a region or partial region made of metal, for example of premium steel. The complete material specifications serve in particular the purpose of securing when a fixation without plastic is to be achieved for the fixation piece.

In a preferred embodiment of the present invention the spring body has a cylindrical, hollow structure with an end facing the support ring. The end facing the support ring may completely line a clearance hole formed in the support ring in a contact forming manner, in particular several clearance holes formed in the support ring, and preferably also a side facing away from the support ring.

In a preferred embodiment of the invention a sealing lip mounted to the support ring and/or an abutment mounted to the support ring are respectively made of the elastomer material of the spring body in the one manufacturing step, and in particular may be injection moulded. Each additional functional elastomer part may be injection moulded in a single manufacturing step.

Preferably, a wall thickness of the hollow cylindrical spring body may be essentially constant in axial direction in order to produce a predicable oscillating behaviour. In particular the spring body may provide essentially the same oscillating characteristic in any direction.

In a further aspect of the present invention at least three fixation pieces may be disposed at equal angular distances at the in particular circular support ring, each on top of a spring body.

Preferably, in certain embodiments the at least one fixation piece is rotationally symmetric (in an axial direction), having a T-shaped cross section, and is preferably designed as a solid body. Lateral legs of the T-shaped cross section facing each other serve on the one hand as support for the in particular hollow, cylindrical spring body and on the other hand as a support for a mounting flange of the damping mass. A main trunk of the T-shaped cross section may be designed such that it can be received with a fit essentially complementary in shape in a passage formed in the mounting flange. In this way it is intended to define the position of the damping mass in radial direction. The lateral legs of the T-shaped cross section extend away from the main trunk.

In a further aspect of the present invention the spring body has an in particular hollow and cylindrical structure of a hollow cylinder with an end section facing the fixation piece. It became apparent that for a sufficient flux of force between the spring body and the fixation piece to be present, it is sufficient for the fixation piece to touch the spring body in a coupling manner only at a radial front surface of the end section of the hollow structure facing the fixation piece, the front surface being designed flat and without steps.

In a preferred embodiment of the present invention the support ring may have a ring plate with an L-shaped cross section. Clearance holes for the spring body are formed in a radial leg of the L-shaped cross section. At a radially inner axial leg of the L-shaped cross section, that is in particular perpendicular to the radial leg, a motion abutment made of elastomer material is disposed that limits a movement in axial as well as in radial direction.

Aspects of the present invention further relate to a damping arrangement with a damping mass like a gas generator to be elastically connected to a motor vehicle part exposed to oscillations and/or vibrations, in particular an airbag module, and with an elastic coupling piece according to the invention connecting the damping mass to the motor vehicle part in an elastically oscillating manner.

Aspects of the present invention further relate to a method for manufacturing an elastic coupling piece for elastically connecting a damping mass like a gas generator to a motor vehicle part exposed to oscillations and/or vibrations, in particular an airbag module. It should be noted that the features relating to technical processes of the elastic coupling piece according to the invention can be part of the method according to the invention. According aspects of the present invention, a support ring facing the vehicle and a fixation piece like a rivet head facing the damping mass, both respectively made of a plastic material, as well as a spring body coupling the support ring and the fixation piece and made of an elastomer material are produced in a single manufacturing step by means of a two-component process, in particular by a two-component injection moulding process.

BRIEF DESCRIPTION OF THE DRAWINGS

Further characteristics, features and advantages will become apparent in the following description of a preferred embodiment in conjunction with the accompanying drawings, showing.

DETAILED DESCRIPTION

Figure 2:
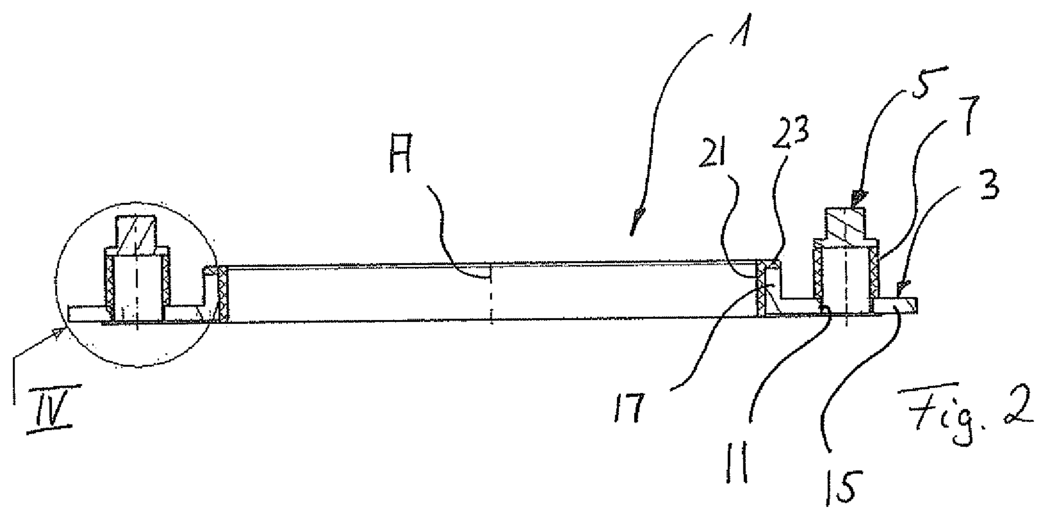
FIG. 2 is a cross-sectional view of the elastic coupling piece of FIG. 1 along the section line II-II of FIG. 1.
Figure 1:
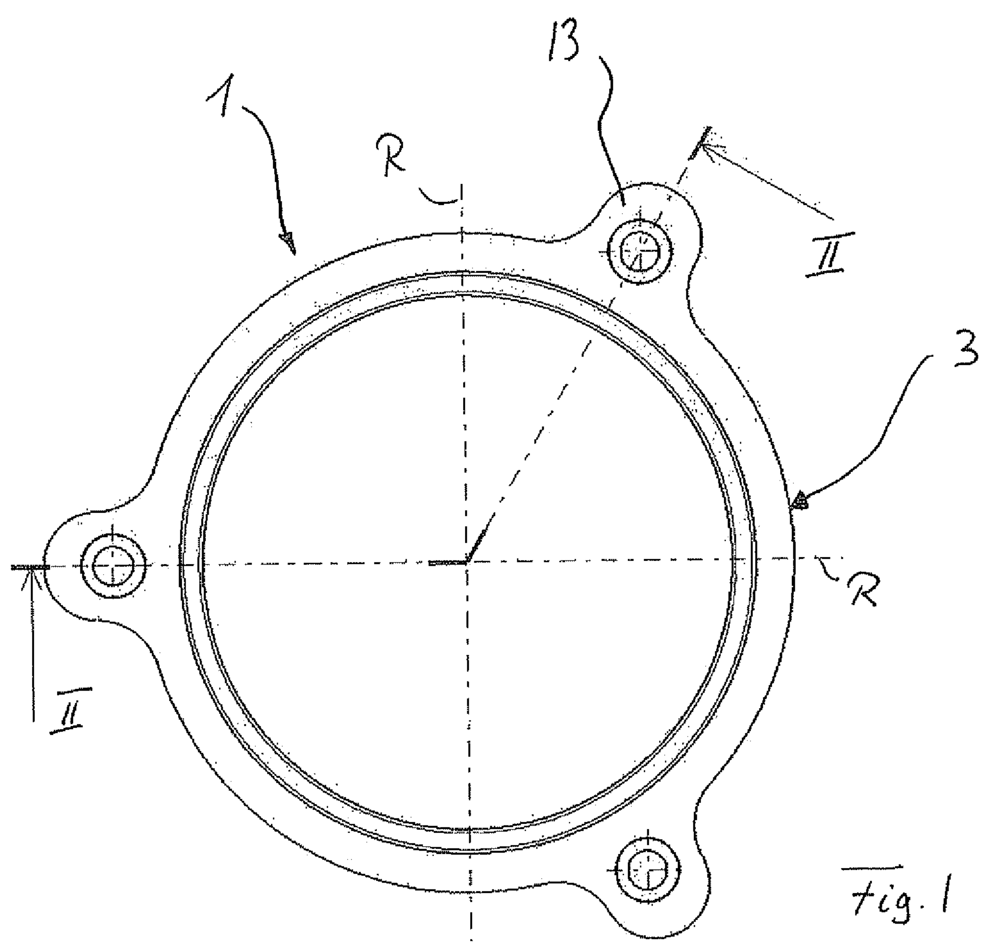
FIG. 1 is a top view of an elastic coupling piece according to an embodiment of the present invention.
Figure 4:
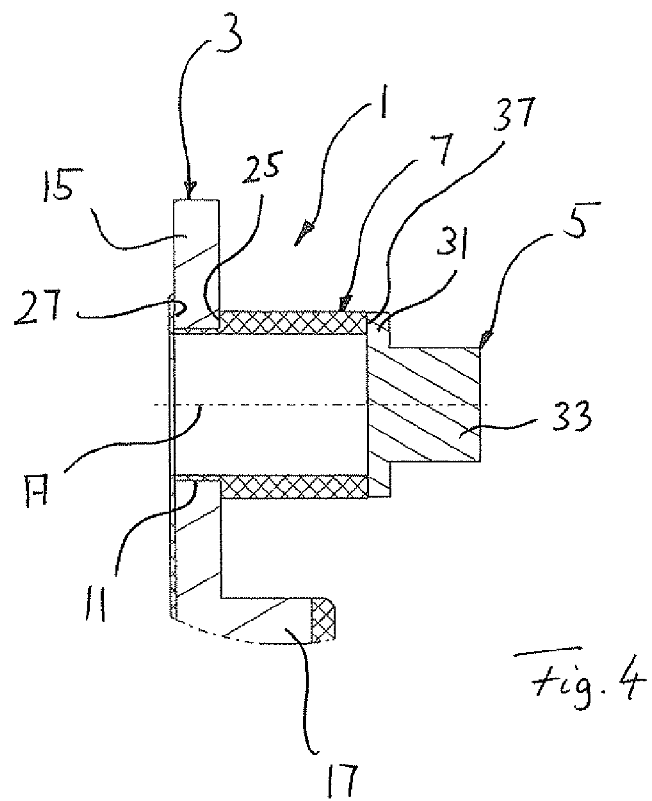
FIG. 4 is a cross-sectional view of the detail IV of FIG. 2, showing a portion of the elastic coupling piece of FIG. 1.

In FIGS. 1, 2 and 4 an embodiment of an elastic coupling piece or device for elastically connecting a damping mass like a gas generator to a motor vehicle part exposed to oscillations and/or vibrations is generally given the reference numeral 1. The elastic coupling piece includes essentially three main components, that is a substantially circular support ring 3, a fixation piece formed as a rivet head 5, and a mainly cylindrical spring body 7 connecting in an elastic, oscillating manner the support ring 3 and the rivet head 5.

As apparent from FIG. 1, three rivet heads are provided which are spaced apart at an angular distance of 120° along the circumference of the circular support ring 3.

The support ring has a clearance hole 11 for each fixation piece, the clearance hole being introduced in a reinforced section 13 of the support ring 3 (FIG. 1).

As apparent from FIGS. 2 and 4, the embodiment of the support ring 3 has an L-shaped radial cross section, the L-shape having a constant pattern along the circumference of the support ring 3 with the exception of the reinforced section 13. At the reinforced section 13 the radial leg 15 of the L-shape is distinctively longer, in particular twice as long as at the 120°-sections of the support ring 3, each of which, among other things, connect two of the reinforced sections 13. An elastomer abutment 21, 23, directly attaches to an axial leg 17, arranged perpendicularly to the radial leg 15, and provides a limitation of the oscillating movement of the damping mass (shown in FIG. 3) in radial direction R and in axial direction A, respectively.

As evident from FIG. 4, at the inner surface parallel to the axial direction A and at the directly adjacent surface area of the support ring 25, 27 the clearance hole 11 is completely lined with the elastomer material of the spring body 7 in a contacting manner.

The embodiment of a spring body 7 has a shape of a hollow cylinder with constant wall thickness and extends axially and concentrically from the clearance hole 11 towards the rivet head 5.

The embodiment of a rivet head 5 may be made of a solid plastic material and has a T-shaped cross-section. The T-shape has two in particular thinner short legs that extend in radial direction and serve as a support for the spring body 7. Besides, at its side facing away from the spring body the radially extending, circulating short leg 31 also serves as a support for a mounting flange of the damping mass, which is evident from FIG. 3 and will be explained later.

The larger main trunk 33 of the T-shape extends away from the short leg 31 in axial direction. The main trunk is dimensioned such that it can be received, in particular with a fit, in a mounting passage of the mounting flange of the damping mass, as visible in FIG. 3.

As shown in FIG. 4, the transition surface 37 between the end section of the spring body facing the rivet head and the flat fixation surface of the side of the short leg 31 of the rivet head facing the spring body 7 forms a plane surface without steps. In order to provide a sufficient flux of force between the rivet head 5 and the spring body 7, the rivet head 5 and the spring body 7 as well as the support ring 3 (for manufacturing reasons) are produced in a single manufacturing step by means of a two-component injection moulding process.

Therein preferably a solid silicone or a liquid silicone (LSR) may be used, which includes to a large extent of Siloxane and further filling agents and additives. By choosing a suitable plastic material it was found that the chemical cross link between the elastomer material and the plastic material achieved by the two-component process is sufficient also for fixation transition areas of small surface area, as represented in FIG. 4 between the rivet head 5 and the spring body 7. The same also holds for the engagement structure facing the support ring realised by the lining of the clearance hole 11. Also the motion abutments 21, 23 may be firmly attached at the plastic support ring. In this way bonding agents between the transition surfaces of the plastic material and the elastomer material are redundant.

Figure 3:
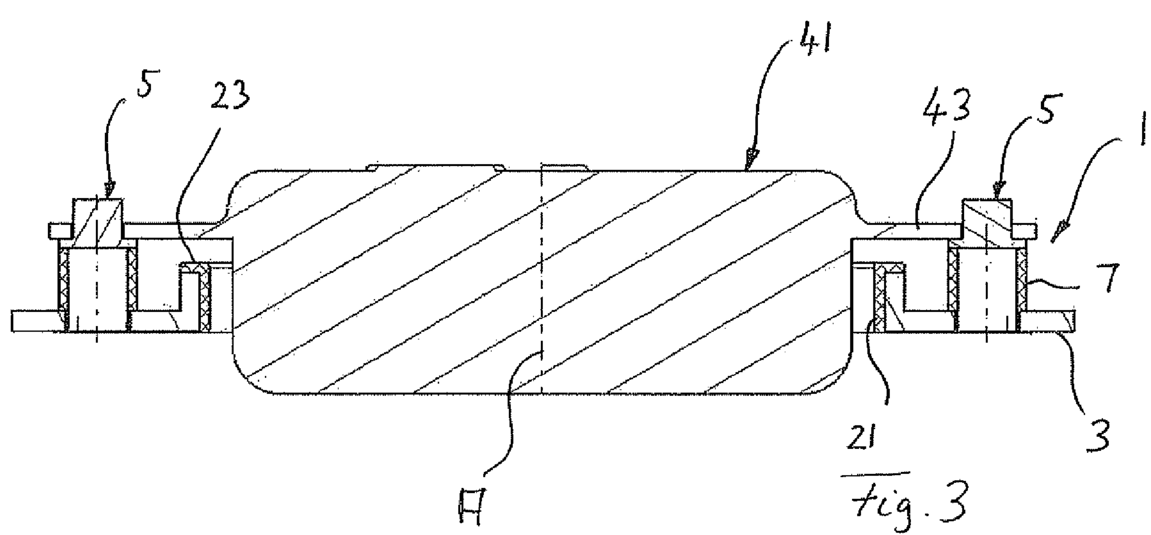
FIG. 3 is a cross-sectional view of a damping arrangement according to an embodiment of the present invention with a gas generator and an elastic coupling piece according to FIGS. 1 and 2.

In FIG. 3 the elastic coupling piece 1 of the invention is installed in a damping arrangement according to an embodiment of the present invention. In this damping arrangement a gas generator 41 is represented to which the elastic coupling piece 1 according to the invention is mounted. The fixation facing the body part in particular to an airbag module is not shown.

For mounting of the damping arrangement openings are formed in the radially extending mounting flange 43 numbering at least the number of the rivet heads 5, which openings are designed complementary in shape with respect to the main trunk 33 of the rivet head 5. In this way an exact positioning of the gas generator 4 is realised with respect to the motor vehicle part, wherein a precise oscillating movement is achieved.

The features disclosed in the above description, the figures and the claims can be significant for the realisation of embodiments of the present invention individually as well as in any combination.

LIST OF REFERENCE NUMERALS

1 coupling device
3 support ring
5 rivet head
7 spring body
11 clearance hole
13 reinforced section
15 radial leg
17 axial leg
21, 23 elastomer abutment
25, 27 surface area of the support ring
31 short leg
33 main trunk
37 transition surface
41 gas generator
43 mounting flange
A axial direction
R radial direction

What is claimed is:

1. An elastic coupling device for elastically connecting a damping mass to a motor vehicle part exposed to oscillations, vibrations, or a combination thereof, the elastic coupling device comprising:

a rigid support ring;

at least one fixation piece, the fixation piece facing the damping mass and being made of a rigid material; and a spring body coupling the support ring and the fixation piece, wherein the support ring, the fixation piece, or a combination thereof comprises a plastic material, and the spring body is made from a liquid silicone rubber, and wherein at least one of the support ring and the fixation piece is produced in a single manufacturing step by means of a two-component process together with the liquid silicone rubber spring body, and wherein the plastic material and the liquid silicone rubber are provided such that a boundary surface area at the transition between the plastic material and the liquid silicon rubber forms a chemical cross-link.

2. The elastic coupling device according to claim 1, wherein the damping mass is a gas generator, the motor vehicle part is an airbag module, the fixation piece is a rivet head, and the two-component process is two-component injection moulding.

3. The elastic coupling device according to claim 1, wherein a boundary surface area at the transition between the plastic material and the liquid silicone rubber is void of a bonding agent.

4. The elastic coupling device according to claim 1, wherein the support ring, the fixation piece, or a combination thereof comprise metal, wherein at a boundary surface area at the transition between at least a section of the support ring or of the fixation piece and the elastomer material a ZnNi layer is provided.

5. The elastic coupling device according to claim 1, wherein the spring body has a hollow, substantially cylindrical structure with an end section facing the support ring, which end section lines in a contact forming manner a clearance hole formed in the support ring.

6. The elastic coupling device according to claim 5, wherein the end section also lines a side of the support ring facing away from the spring body.

7. The elastic coupling device according to claim 5, wherein a sealing lip mounted to the support ring, an abutment mounted to the support ring, or a combination thereof comprise the liquid silicone rubber of the spring body and are made in the one manufacturing step, wherein a wall thickness of the hollow cylindrical spring body is substantially constant in an axial direction.

8. The elastic coupling device according to claim 1, wherein at least three fixation pieces are disposed at equal angular distances around the support ring.

9. The elastic coupling device according to claim 1, wherein the at least one fixation piece is rotationally symmetric and has a T-shaped cross section, wherein lateral legs, facing each other, serve as support for the spring body and on the other hand as a support for a mounting flange of the damping mass.

10. The elastic coupling device according to claim 9, wherein a main trunk, from which the lateral legs are facing away, is received in a passage formed in the mounting flange.

11. The elastic coupling device according to claim 1, wherein the spring body has a hollow, substantially cylindrical structure with an end section facing the fixation piece.

12. The elastic coupling device according to claim 1, wherein the fixation piece touches the spring body in a coupling manner only at a radial front surface of the end section facing the fixation piece.

13. The elastic coupling device according to claim 1, wherein the support ring has a ring plate with an L-shaped cross section, wherein clearance holes for the spring body are formed in a radial leg, and a motion abutment made of elastomer material is disposed in an axial direction, radial direction, or a combination thereof at a radially inner axial leg.

14. A damping system for use with a motor vehicle part exposed to oscillations, vibrations, or a combination thereof, the damping system comprising:

an elastic coupling device comprising:

a rigid support ring;

at least one fixation piece, the fixation piece facing the damping mass and being made of a rigid material; and a spring body coupling the support ring and the fixation piece, wherein the support ring, the fixation piece, or a combination thereof comprises a plastic material, and the spring body is made from a liquid silicone rubber, wherein at least one of the support ring and the fixation piece is produced in a single manufacturing step by means of a two-component process together with the liquid silicone rubber spring body, and wherein in that the plastic material and the liquid silicon rubber are provided such that a boundary surface area at the transition between the plastic material and the liquid silicone rubber forms a chemical cross-link, and a damping mass elastically connected to the motor vehicle part with the elastic coupling device.

15. The damping system according to claim 14, wherein the damping mass is a gas generator, the motor vehicle part is an airbag module, the fixation piece is a rivet head, and the two-component process is two-component injection moulding.

16. A method for manufacturing an elastic coupling device for elastically connecting a damping mass to a motor vehicle part exposed to oscillations, vibrations, or a combination thereof, wherein the elastic coupling device comprises:

a rigid support ring comprising a plastic material;

at least one fixation piece, the fixation piece facing the damping mass and being made of a rigid plastic material; and a spring body made from a liquid silicone rubber and coupling the support ring and the fixation piece facing the damping mass, the method comprising making at least one of the support ring and the fixation piece in a single manufacturing step by means of a two-component process together with the liquid silicone rubber spring body, wherein in that the plastic material and the liquid silicon rubber are provided such that a boundary surface area at the transition between the plastic material and the liquid silicone rubber forms a chemical cross-link.

17. The method according to claim 16, wherein the damping mass is a gas generator, the motor vehicle part is an airbag module, the fixation piece is a rivet head, and the two-component process is two-component injection moulding.

* * * * *